United States Patent
Lee et al.

(10) Patent No.: US 9,318,731 B2
(45) Date of Patent: Apr. 19, 2016

(54) BATTERY PACK

(75) Inventors: Hyun-Ye Lee, Yongin-si (KR);
Tae-Young Kim, Yongin-si (KR);
Myung-Chul Kim, Yongin-si (KR);
Shi-Dong Park, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 661 days.

(21) Appl. No.: 12/926,209

(22) Filed: Nov. 2, 2010

(65) Prior Publication Data
US 2011/0117401 A1    May 19, 2011

Related U.S. Application Data

(60) Provisional application No. 61/272,930, filed on Nov. 19, 2009.

(51) Int. Cl.
*H01M 2/12*    (2006.01)
*B23P 11/00*    (2006.01)
(Continued)

(52) U.S. Cl.
CPC .......... *H01M 2/1083* (2013.01); *H01M 2/0245* (2013.01); *H01M 2/1077* (2013.01); *H01M 2/12* (2013.01); *Y10T 29/49826* (2015.01)

(58) Field of Classification Search
CPC ............ H01M 2/1083; H01M 2/0245; H01M 2/1077; H01M 2/12; H01M 2/0247; H01M 2/1211; H01M 2/1217; H01M 2/1223; H01M 2/1229; H01M 2/1088; H01M 2/1205

USPC .......... 429/53, 54, 71, 72, 82, 100, 151, 159; 180/68.5
See application file for complete search history.

(56) References Cited

U.S. PATENT DOCUMENTS

| 8,299,801 B2 * | 10/2012 | Yano et al. ................. 324/427 |
| 2005/0212477 A1 | 9/2005 | Uchida et al. |
| 2007/0141459 A1 * | 6/2007 | Goto et al. ................. 429/159 |

(Continued)

FOREIGN PATENT DOCUMENTS

| EP | 1 775 784 A1 | 4/2007 |
| JP | 2005-285516 A | 10/2005 |

(Continued)

OTHER PUBLICATIONS

Federal Register/vol. 76, No. 27, Date: Feb. 9, 2011; "Supplementary Examination Guidelines for Determining Compliance with 35 U.S. C. 112 and for Treatment of Related Issues in Patent Applications" pp. 7162-7175.*

(Continued)

*Primary Examiner* — Ula C Ruddock
*Assistant Examiner* — Amanda Barrow
(74) *Attorney, Agent, or Firm* — Lee & Morse, P.C.

(57) ABSTRACT

A battery pack includes a first battery module, the first battery module including unit batteries, a first plate, and a second plate, and a second battery module, the second battery module including unit batteries, a first plate, and a second plate. The first battery module may be stacked on the second battery module, the second plate of the first battery module may be between the first battery module and the second battery module, and the second plate of the first battery module may support the unit batteries of the first battery module and contact the first plate of the second battery module.

16 Claims, 7 Drawing Sheets

(51) Int. Cl.
*H01M 2/10* (2006.01)
*H01M 2/02* (2006.01)

(56) References Cited

U.S. PATENT DOCUMENTS

| | | | |
|---|---|---|---|
| 2009/0053586 A1* | 2/2009 | Fredriksson et al. | 429/57 |
| 2009/0087707 A1* | 4/2009 | Indersie et al. | 429/26 |
| 2009/0111007 A1* | 4/2009 | Naganuma | 429/82 |
| 2009/0142650 A1* | 6/2009 | Okada et al. | 429/71 |
| 2009/0220851 A1* | 9/2009 | Nakazawa et al. | 429/58 |
| 2009/0258286 A1* | 10/2009 | Ho | 429/100 |
| 2010/0035142 A1 | 2/2010 | Ha et al. | |
| 2010/0151299 A1 | 6/2010 | Ha et al. | |
| 2011/0104552 A1* | 5/2011 | Kim et al. | 429/151 |

FOREIGN PATENT DOCUMENTS

| | | | | | |
|---|---|---|---|---|---|
| JP | 2009-170258 | * | 7/2009 | | H01M 2/10 |
| JP | 2009-170258 A | | 7/2009 | | |
| KR | 10 2008-0025428 A | | 3/2008 | | |
| KR | 10 2008-0025429 A | | 3/2008 | | |
| WO | PCT/EP2007/051467 | * | 8/2007 | | H01M 2/12 |
| WO | WO 2008/035872 A1 | | 3/2008 | | |
| WO | WO 2008/035875 A1 | | 3/2008 | | |

OTHER PUBLICATIONS

European Office Action in EP 10174073.6-1227, dated Nov. 16, 2010 (Lee, et al.).
Japanese Office Action in JP 2010-259000, dated Dec. 11, 2012 (Lee, et al.).
Chinese Office Action Dated Dec. 23, 2013.
Chinese Office Action mailed Mar. 6, 2015 in corresponding Chinese Patent Application No. 201010562726.6; Lee, et al.

* cited by examiner

BATTERY PACK

CROSS-REFERENCE TO RELATED APPLICATION

This application claims priority to U.S. Provisional Application No. 61/272,930, filed in the U.S. Patent and Trademark Office on Nov. 19, 2009, and entitled "BATTERY PACK," which is incorporated by reference herein in its entirety and for all purposes.

BACKGROUND

1. Field

Embodiments relate to a battery pack.

2. Description of the Related Art

As the number of gasoline vehicles has increased, the amount of vehicle exhaust emission has also increased. Vehicle exhaust emission includes large amounts of harmful substances, such as nitrogen oxide due to combustion, carbon monoxide or hydrocarbon due to imperfect combustion, or the like, and is recognized as a serious environmental pollution problem. As fossil fuels are anticipated to be significantly diminished in the not too distant future, development of next generation energy sources and hybrid electric vehicles have become important issues. In terms of commercializing hybrid electric vehicles, mileage of such vehicles is determined by battery performance. Currently, however, batteries do not have enough electrical energy for powering hybrid electric vehicles for a desirable period of time or mileage. If vehicles use energy sources such as gasoline, light oil, gas, or the like, the vehicles may quickly refuel in filling stations or gas charging stations. However, even when an electric charging station is available, it takes a long time to charge a hybrid electric vehicle, which is an obstacle to commercialization. Thus, with regard to hybrid electric vehicles, improving battery performance, compared to other technologies regarding hybrid electric vehicles, is recognized as an important problem.

SUMMARY

It is a feature of an embodiment to provide a battery pack including a plurality of stacked battery modules each including secondary batteries, which prevents deviation of the secondary batteries by effectively supporting its weight and effectively emits gas, generated in the battery modules, to the outside.

It is another feature of an embodiment to provide a battery pack that effectively emits gas, generated in the battery modules, to the outside.

At least one of the above and other features and advantages may be realized by providing a battery pack, including a first battery module, the first battery module including unit batteries, a first plate, and a second plate, and a second battery module, the second battery module including unit batteries, a first plate, and a second plate. The first battery module may be stacked on the second battery module, the second plate of the first battery module may be between the first battery module and the second battery module, and the second plate of the first battery module may support the unit batteries of the first battery module and contact the first plate of the second battery module.

The second plate of the first battery module and the first plate of the second battery module may be combined to form a duct.

The unit batteries of the second battery module may include respective vents, and the first plate of the second battery module may be sealed to the unit batteries of the second battery module at the vents of the unit batteries of the second battery module.

The battery pack may further include a third battery module, the third battery module being combined with the first and second battery modules in a vertical stack, wherein a respective duct is disposed between adjacent battery modules in the vertical stack, the respective ducts each being formed by a combination of a first plate and a second plate, the respective ducts each having gas inlets aligned with vents in unit batteries of the battery modules.

The battery pack may further include a collector receiving gases from the respective ducts.

The collector may include respective outlets coupled to the respective ducts.

The collector may include a sealing body receiving gases from each of the respective ducts.

A first sealing member may be disposed between the first plate of the second battery module and the unit batteries of the second battery module to seal gas inlets in the first plate of the second battery module to the vents of the unit batteries of the second battery module.

The unit batteries of the first battery module may include respective vents, a second sealing member may be disposed between the first plate of the first battery module and the unit batteries of the first battery module to seal gas inlets in the first plate of the first battery module to the vents of the unit batteries of the first battery module, and the battery pack may include a cover sealed to the first top plate of the first battery module, the cover and the first top plate of the first battery module defining at least part of a duct for venting gases from the unit batteries of the first battery module.

The second plate of the first battery module may have a channel shape that includes a top part and side parts, the top part may contact the unit batteries of the first battery module, and the side parts may extend from the top part towards the second battery module, the side parts stiffening the second plate of the first battery module and contacting the first plate of the second battery module.

The side parts may be sealed to the first plate of the second battery module.

The battery pack may further include a sealing member disposed between the side parts of the first battery module and the first plate of the second battery module, the second sealing member sealing the side parts of the first battery module to the first plate of the second battery module.

The battery pack may further include a first battery module end plate at an end of the first battery module, and a second battery module end plate at a corresponding end of the second battery module. The second plate of the first battery module may be pressed against the first plate of the second battery module by a clamping force applied between the first battery module end plate and the second battery module end plate.

The battery pack may further include another first battery module end plate at another end of the first battery module, such that the first battery module includes the unit batteries between the first battery module end plates, and a first restraint plate disposed along a first side of the unit batteries of the first battery module, and a second restraint plate disposed along a second side of the unit batteries of the first battery module. The first and second restraint plates may be fixed to side portions of the first battery module end plates so as to laterally constrain the unit batteries of the first battery module.

The first and second restraint plates may apply a compressive force to sides of the unit batteries of the first battery module.

The battery pack may further include a first battery module end plate at an end of the first battery module, and a second battery module end plate at a corresponding end of the second battery module. The second battery module end plate may include extended portions at an upper part thereof and a groove between the extended portions, the groove receiving the second plate of the first battery module and the first plate of the second battery module.

The extended portions may have a height that is less than a sum of a height of the second plate of the first battery module and a thickness of the first plate of the second battery module.

At least one of the above and other features and advantages may also be realized by providing a battery pack, including a first battery module, the first battery module including unit batteries arranged side by side, a second battery module adjacent to the first battery module, the second battery module including unit batteries that have vents in an upper face thereof, the unit batteries of the second battery module being arranged side by side, the first and second battery modules extending in a same direction, and a rigid duct between the first battery module and the second battery module, the rigid duct supporting the unit batteries of the first battery module and being in flow communication with the vents of the unit batteries of the second battery module.

At least one of the above and other features and advantages may also be realized by providing a vehicle, including a power source, the power source providing a motive power for the vehicle, and a battery pack configured to provide electricity to the power source, the battery pack including a first battery module, the first battery module including unit batteries, a first plate, and a second plate, and a second battery module, the second battery module including unit batteries, a first plate, and a second plate. The first battery module may be stacked on the second battery module, the second plate of the first battery module may be between the first battery module and the second battery module, and the second plate of the first battery module may support the unit batteries of the first battery module and contact the first plate of the second battery module.

At least one of the above and other features and advantages may also be realized by providing a method of forming a battery pack, the method including providing a first battery module, the first battery module including unit batteries, a first plate, and a second plate, and arranging a second battery module adjacent to the first battery module such that the first battery module is stacked on the second battery module, the second battery module including unit batteries, a first plate, and a second plate. The second plate of the first battery module may be disposed between the first battery module and the second battery module, and the second plate of the first battery module may be disposed to support the unit batteries of the first battery module and to contact the first plate of the second battery module.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
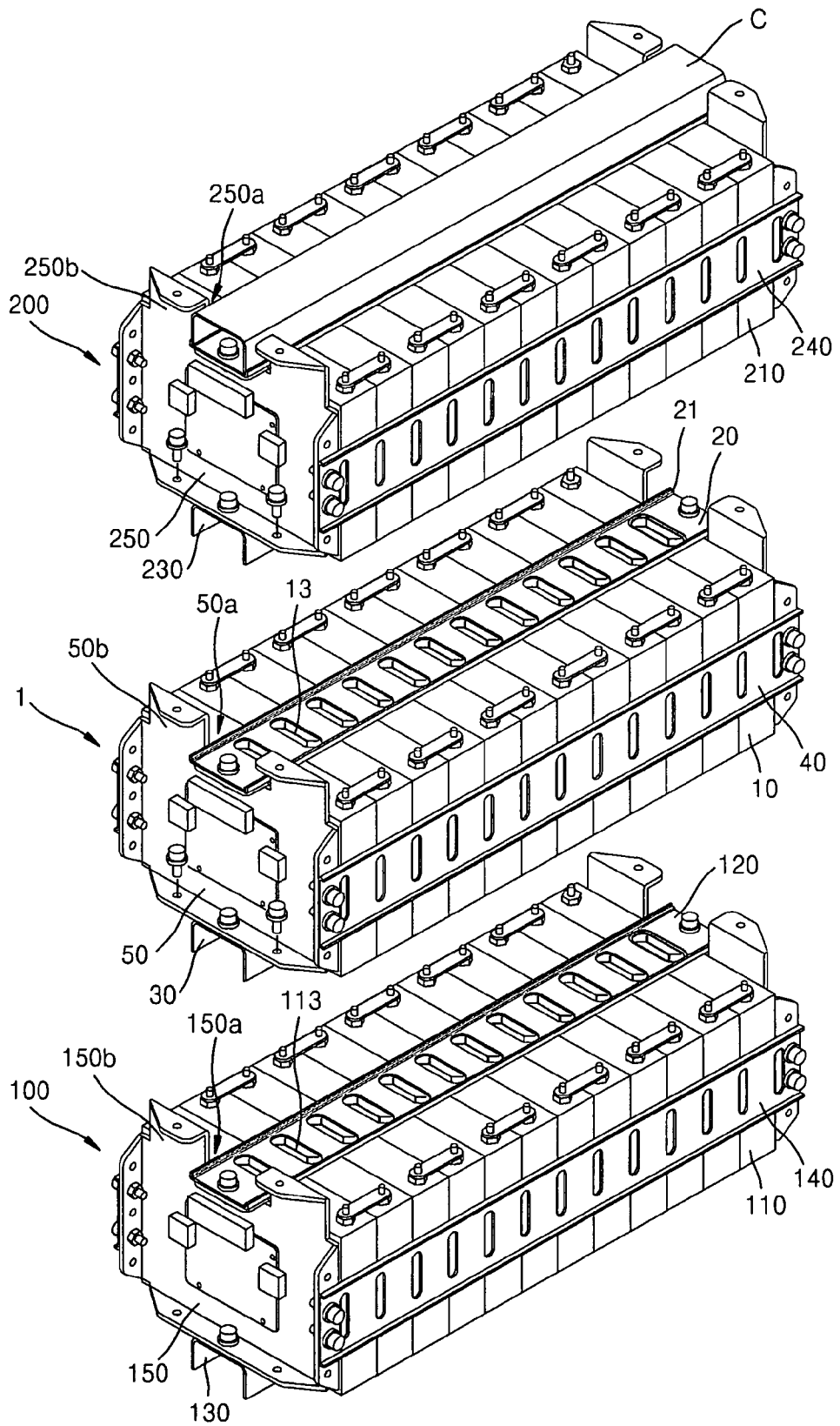
FIG. 1 illustrates a schematic perspective view of a battery pack including a plurality of battery modules disposed one above the other, according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A battery pack according to an embodiment will be described. The battery pack may include a plurality of battery modules. Each of the battery modules may be formed by arranging a plurality of secondary batteries in a predetermined direction and electrically connecting the secondary batteries to each other. Each of the secondary batteries may be a lithium secondary battery.

In an implementation, each battery module may include twelve secondary batteries, and the battery pack may include eight battery modules stacked in four layers. However, the numbers of secondary batteries and battery modules are not limited thereto, and one of ordinary skill in the art would understand that various other configurations are possible.

A longitudinal center portion of a battery module in which the secondary batteries are arranged may deviate due to its own weight. Besides, lithium secondary batteries have a long lifespan and light weight compared to general Ni—Cd, Ni-MH batteries, or the like, but have a risk of explosion. When lithium secondary batteries explode due to overcharging, overdischarging, or another reason, a large amount of toxic gas is emitted. In this regard, referring to FIGS. 1 through 4, a battery pack according to an embodiment may provide enhanced stiffness and provisions to exhaust harmful gas.

Figure 2:
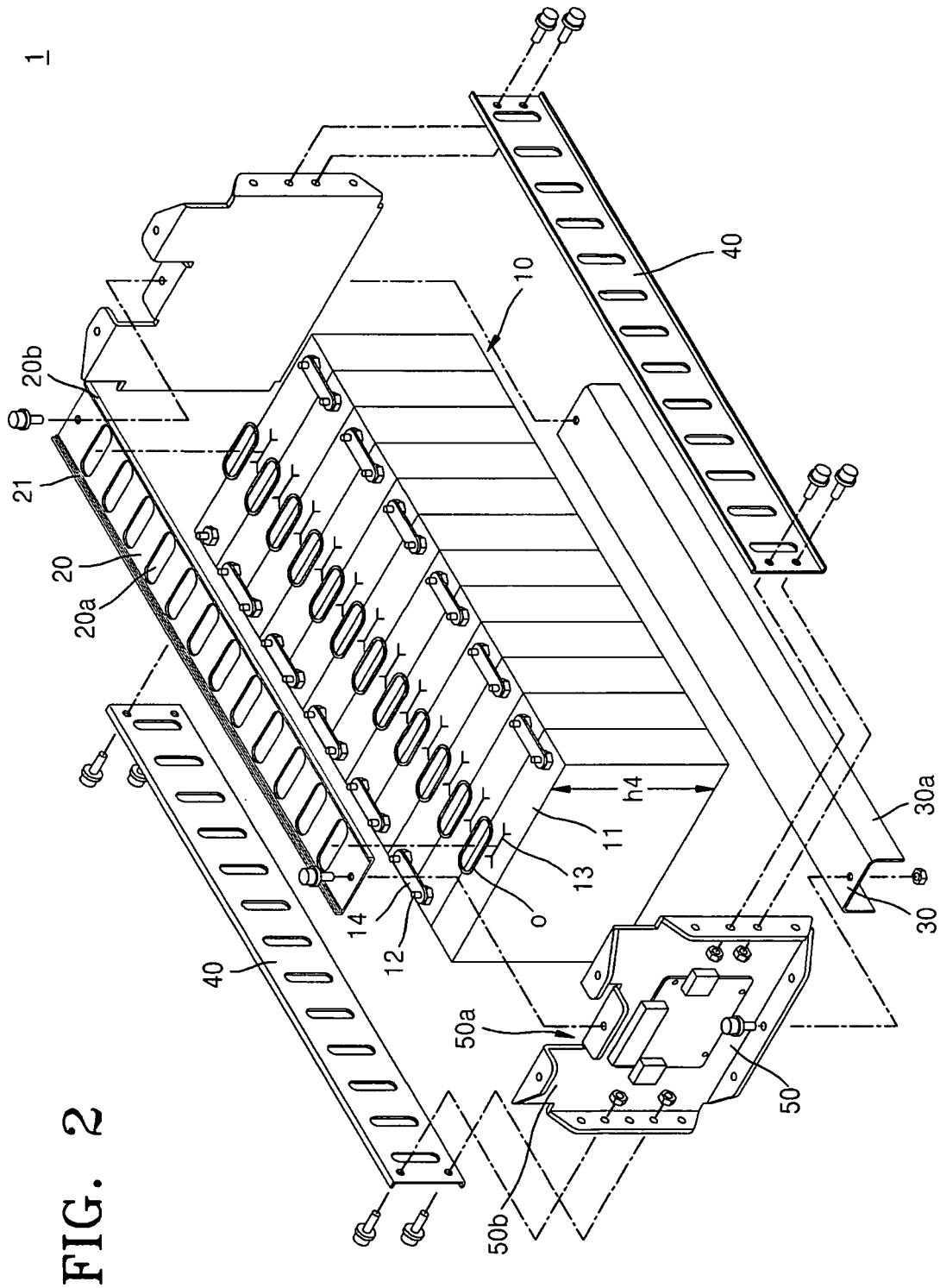
FIG. 2 illustrates an exploded perspective view of one of the battery modules of FIG. 1, according to an embodiment.
Figure 3:
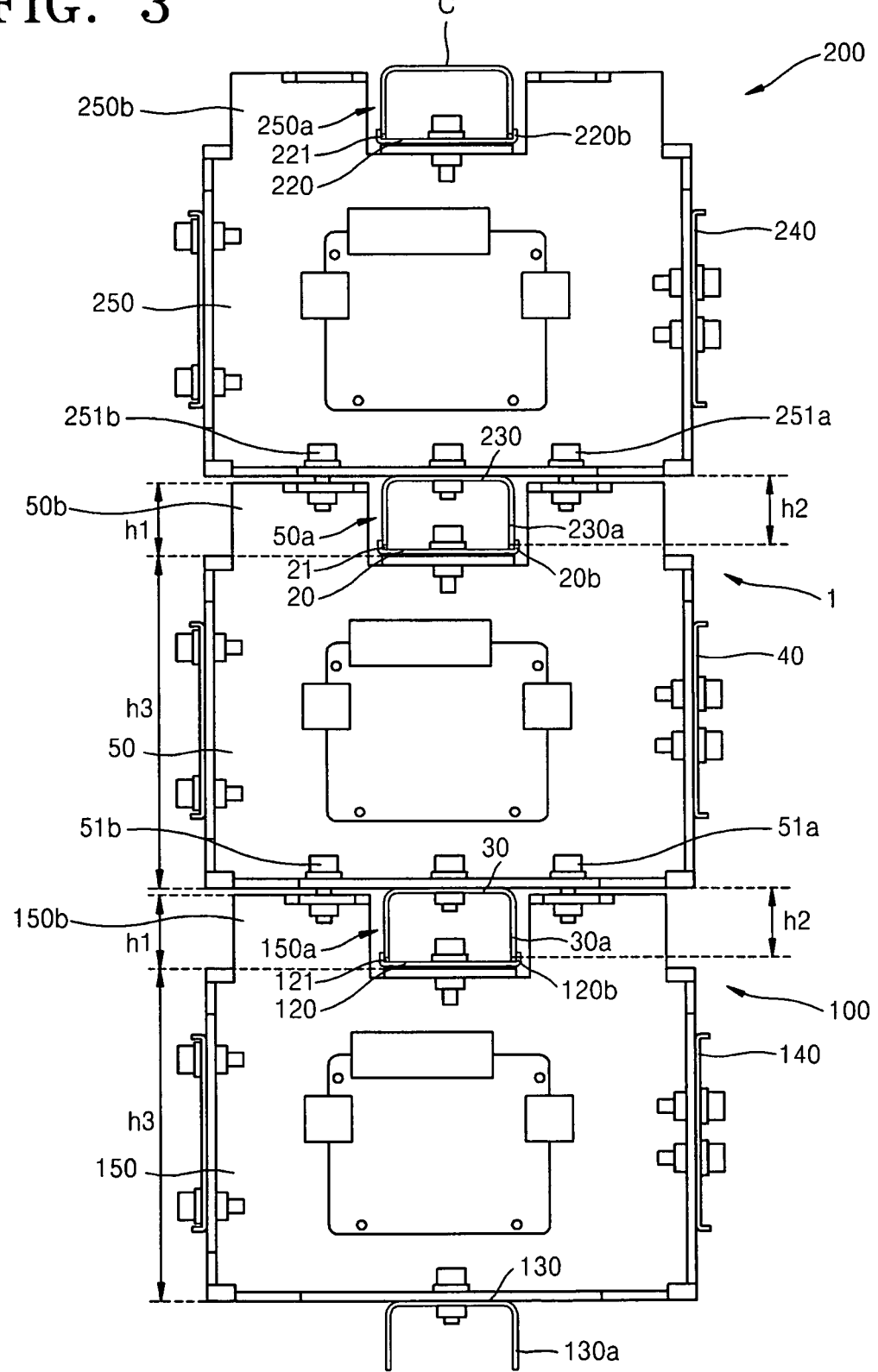
FIG. 3 illustrates a front view of a state in which the battery modules of FIG. 1 are coupled, according to an embodiment.

FIG. 1 illustrates a schematic perspective view of a second battery module 100, a first battery module 1, and a third battery module 200 disposed one above the other, FIG. 2 illustrates an exploded perspective view of the first battery module 1, FIG. 3 illustrates a front view of a state in which the second battery module 100, the first battery module 1, and the third battery module 200 are coupled to each other, and FIG.

4 illustrates a schematic perspective view for describing gas emission from the second battery module 100, the first battery module 1, and the third battery module 200, according to embodiments.

Referring to FIGS. 1 through 4, a battery pack according to an embodiment may include the first battery module 1, the second battery module 100, and the third battery module 200 each including a duct in a bottom plate 30 thereof, wherein the duct allows a large amount of toxic gas, e.g., generated when a secondary battery 10 explodes, to be easily emitted.

In the example embodiment shown in FIGS. 3 and 4, the first and third battery modules 100 and 200 are respectively disposed below and above the first battery module 1. The battery pack may include the second battery module 100, the first battery module 1, and the third battery module 200 stacked on top of each other in sequence. Referring to FIG. 2, the first battery module 1 may include a plurality of secondary batteries 10, a top plate 20, a bottom plate 30, a restraint plate 40, and an end plate 50. The components of the second battery module 100, the first battery module 1, and the third battery module 200 may be substantially the same.

Each of the secondary batteries 10 may include an electrode assembly (not shown), a sealing body 11, and an electrode terminal 12. The electrode assembly may include an anode plate, a separator, and a cathode plate, and may be a winding type or a stack type assembly. The sealing body 11 may accommodate the electrode assembly. The electrode terminal 12 may protrude from the sealing body 11 and electrically connect the secondary battery 10 with an external device. The sealing body 11 may include a vent 13. The vent 13 may be formed to be easily perforated, so that the gas generated in the sealing body 11 can perforate the vent 13 in the event of excess pressure within the sealing body 11, the gas being emitted to the outside through the perforated vent 13.

The plurality of secondary batteries 10 facing one another may be arranged in a predetermined direction and may be electrically connected to one another. For example, the secondary batteries 10 may be connected to one another in series and/or in parallel. To connect the secondary batteries 10 in series, anode plates and cathode plates of the secondary batteries 10 may be alternately arranged. The electrode terminals 12 of the secondary batteries 10 may be connected to each other by a bus bar 14.

The electrode assembly of the secondary battery 10 may contain lithium, and may expand and/or contract through charging and discharging. The expansion and contraction of the electrode assembly may exert a physical force on the sealing body 11, and thus the sealing body 11 may expand and contract physically according to changes of the electrode assembly.

The changes of the sealing body 11 may be fixed by the repeated expansion and contraction, and the expansion may increase resistance, thereby decreasing efficiency of the secondary battery 10. Accordingly, the one pair of end plates 50 may be arranged in a predetermined direction to be respectively disposed at both ends portions of the secondary batteries 10 electrically connected to one another. The restraint plate 40 may be connected to a side portion of the end plate 50 to compress and fix the secondary batteries 10 so that variation in a lengthwise direction of the secondary batteries 10 (through expansion and contraction) is reduced or eliminated.

The top plate 20 may be disposed on the plurality of secondary batteries 10 and may be connected to an upper portion of the end plate 50. Openings 20a formed in the top plate 20 may be respectively disposed to correspond to the vents 13 of the secondary batteries 10.

The top plate 20 may include top plate side portions 20b formed on both longitudinal sides of the top plate 20, such that the top plate side portions 20b protrude upwards and the top plate 20 has a U shape. A first sealing member 21, which may be formed of, e.g., rubber, may be disposed along each of the top plate side portions 20b. Each of the openings 20a formed in the top plate 20 may include a seal, e.g., a sealing ring O or a monolithic sealing member that seals a plurality of unit batteries, between the top plate 20 and the corresponding vent 13, so that when gas is emitted from the vent 13, the gas does not affect the adjacent secondary battery 10 and is emitted through the opening 20a. The sealing ring O may be an O-shaped ring.

A groove 50a may be formed in an upper center portion of the end plate 50 to accommodate the top plate 20. The openings 20a of the top plate 20 may be disposed in close proximity to the secondary batteries 10. For example, as shown in FIG. 3, a height h3 between a bottom surface of the end plate 50 and a bottom surface of the groove 50a formed in the upper center portion of the ending plate 50 may be formed to be equal to or less than a height h4 of the secondary batteries 10, so that the top plate 20 may be coupled to the end plate 50 without forming a space between the secondary batteries 10 and the top plate 20 with the sealing rings O interposed therebetween. When the top plate 20 is coupled to the end plate 50, the top plate 20 may exert pressure on the secondary batteries 10 and compresses the sealing rings O interposed between the secondary batteries 10 and the top plate 20, and thus the top plate 20 and the secondary batteries 10 may be sealed.

The bottom plate 30 may be disposed under the secondary batteries 10 to support the weight of the plurality of secondary batteries 10, and may be connected to a lower portion of the end plate 50.

Referring to FIG. 2, in order to withstand the weight of the secondary batteries 10, the bottom plate 30 may include bottom plate side portions 30a. The bottom plate side portions 30a may be formed on both longitudinal sides of the bottom plate 30 such that the bottom plate side portions 30a protrude downwards. The bottom plate side portions 30a may form a path with the top plate 120 of the second battery module 100 underneath, so as to serve as a duct for emitting gas when gas is generated. The bottom plate 30 of the first battery module 1 and the second top plate 120 of the second battery module 100, which is disposed under the bottom plate 30, may form a path for emitting gas when sealed, even if not perfectly sealed.

When gas is generated in a secondary battery, explosion and rapid chemical reaction due to the explosion may accompany the gas generation. Thus, a large amount of gas may be generated explosively in a short time. Accordingly, where a duct for emitting gas is formed in a battery pack according to an embodiment, gas may be easily emitted. In an implementation, the battery pack may further include a cooling passage through the battery pack, the cooling passage cooling the battery modules, wherein the duct is configured to keep gases exiting the unit batteries separate from the cooling passage.

The shape of the bottom plate 30 when the battery modules 1 are stacked will be described in further detail with reference to FIG. 3. The battery pack may be formed by stacking the second battery module 100, the first battery module 1, and the third battery module 200 on top of one another. The number of stackable battery modules is not limited. However, for convenience of description, three battery modules, the second battery module 100, the first battery module 1, and the third battery module 200 are stacked in a triple-layered structure as illustrated in FIG. 3.

Referring to FIG. 3, the bottom plate 30 of the first battery module 1 will now be described. The bottom plate 30 of the first battery module 1 may have a shape corresponding to that of the second top plate 120 of the second battery module 100. Referring to FIGS. 3 and 4, when gas is generated due to explosion in a secondary battery 110 of the second battery module 100, gas may be emitted through the vents 113 of the second battery module 100, and the gas may be emitted through a second opening part (see openings 20a in FIG. 2) of the second top plate 120. The bottom plate 30 and the second top plate 120 of the second battery module 100 correspond to each other to serve as a duct which is a path of gas emission.

A second sealing member 121 may be interposed between the bottom plate 30 of the first battery module 1 and the second top plate 120 of the second battery module 100. The first, second and third sealing members 21, 121, and 221 may be formed of, e.g., rubber, and may be sealed by a tightening force between the bottom plate 30 and the second top plate 120. The bottom plate 30 and the second top plate 120 may be joined together by coupling the end plate 50 of the first battery module 1 with the second battery module 100 disposed under the first battery module 1. For example, in FIG. 3, the end plates 50 and 150 may be connected to each other by lower connecting members 51a and 51b.

To enhance cohesion between the bottom plate 30 and the second top plate 120, the second end plate 150 may have a shape in which a height h1 of an extended portion 150b formed in an upper end portion of the second end plate 150 is less than a height h2 of the bottom plate side portions 30a. Thus, when the height h2 of the bottom plate side portions 30a is greater than the height h1 of the extended portion 150b formed in the upper end portion of the second end plate 150, cohesion between the lower connecting members 51a and 51b may be concentrated in between the bottom plate 30 and the second top plate 120 to seal them.

In this regard, thicknesses of the second top plate 120 and the second sealing member 121 may be considered for cohesion between the bottom plate 30 and the second top plate 120. Thus, the second top plate 120, the second sealing member 121, and the bottom plate 30 may be sequentially stacked, and the extended portion 150b formed in the upper end portion of the second end plate 150 and a lower portion of the end plate 50 may be coupled by the lower connecting members 51a and 51b. Accordingly, the thicknesses of the second top plate 120 and the second sealing member 121 may affect cohesion between the bottom plate 30 and the second top plate 120. When the height h1 of the extended portion 150b formed in the upper end portion of the second end plate 150 and the height h2 of the bottom plate side portions 30a are determined, if the second top plate 120 and/or the second sealing member 121 are relatively thick, cohesion between the bottom plate 30 and the second top plate 120 by the lower connecting members 51a and 51b may be enhanced.

In the example embodiment illustrated in FIG. 2, it can be seen that the top plate 20 of the first battery module 1 corresponds to a third bottom plate 230 of the third battery module 200 disposed on the first battery module 1 to form a duct for emitting gas generated in the first battery module 1. The third bottom plate 230 may have sides 230a extending toward the top plate 20.

In FIG. 3, the third battery module 200 is disposed uppermost among the first, second and third battery modules 1, 100, and 200. The third top plate 220 of the third battery module 200 may be covered with a duct for emitting gas. The duct covering the third top plate 220 may have various structures. For example, the third top plate 220 may be covered with a cover C to form an integrated pipe shape in a lengthwise direction. In an implementation, the height of the third top plate 220 covered with the cover C may be less than or equal to than that of an extended portion 250b formed in an upper end portion of the third battery module 200, and thus may be formed to be compact in size.

Figure 4:
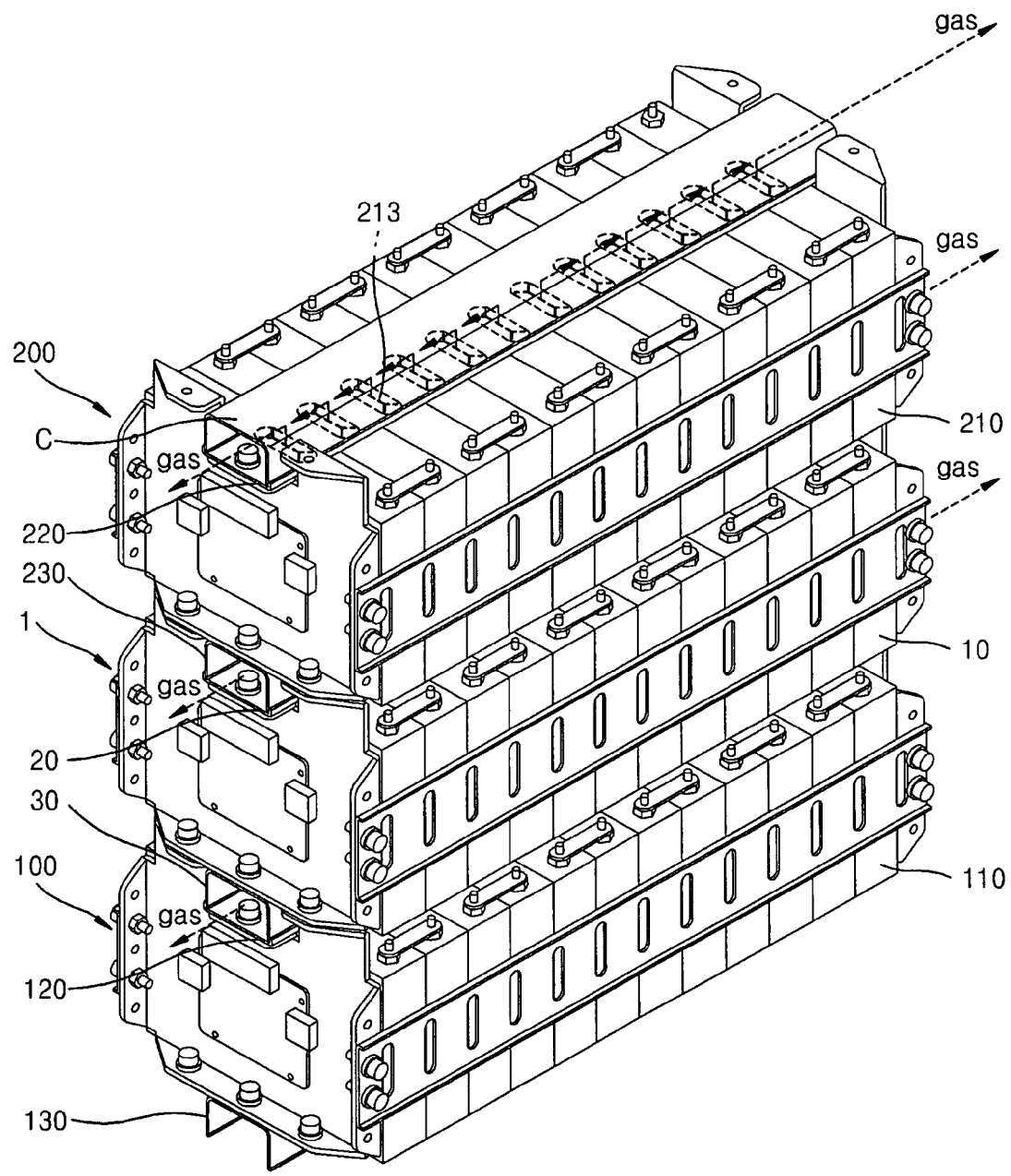
FIG. 4 illustrates a schematic perspective view for describing gas emission from the battery modules, according to an embodiment.

Referring to FIG. 4, the first, second, and third top plates 20, 120, and 220 of the first, second, and third battery modules 1, 100, and 200, which are sequentially stacked, and the first, second and third bottom plates 30, 130, and 230 may be overlapped with one another, thereby forming ducts through which gas is emitted. Thus, gas emitted from the vents 13, 113, and 213 of the secondary batteries 10 may be emitted to the outside though the ducts formed by overlapping the first, second, and third top plates 20, 120, and 220 and the first, second, and third bottom plates 30, 130, and 230.

Figure 5:
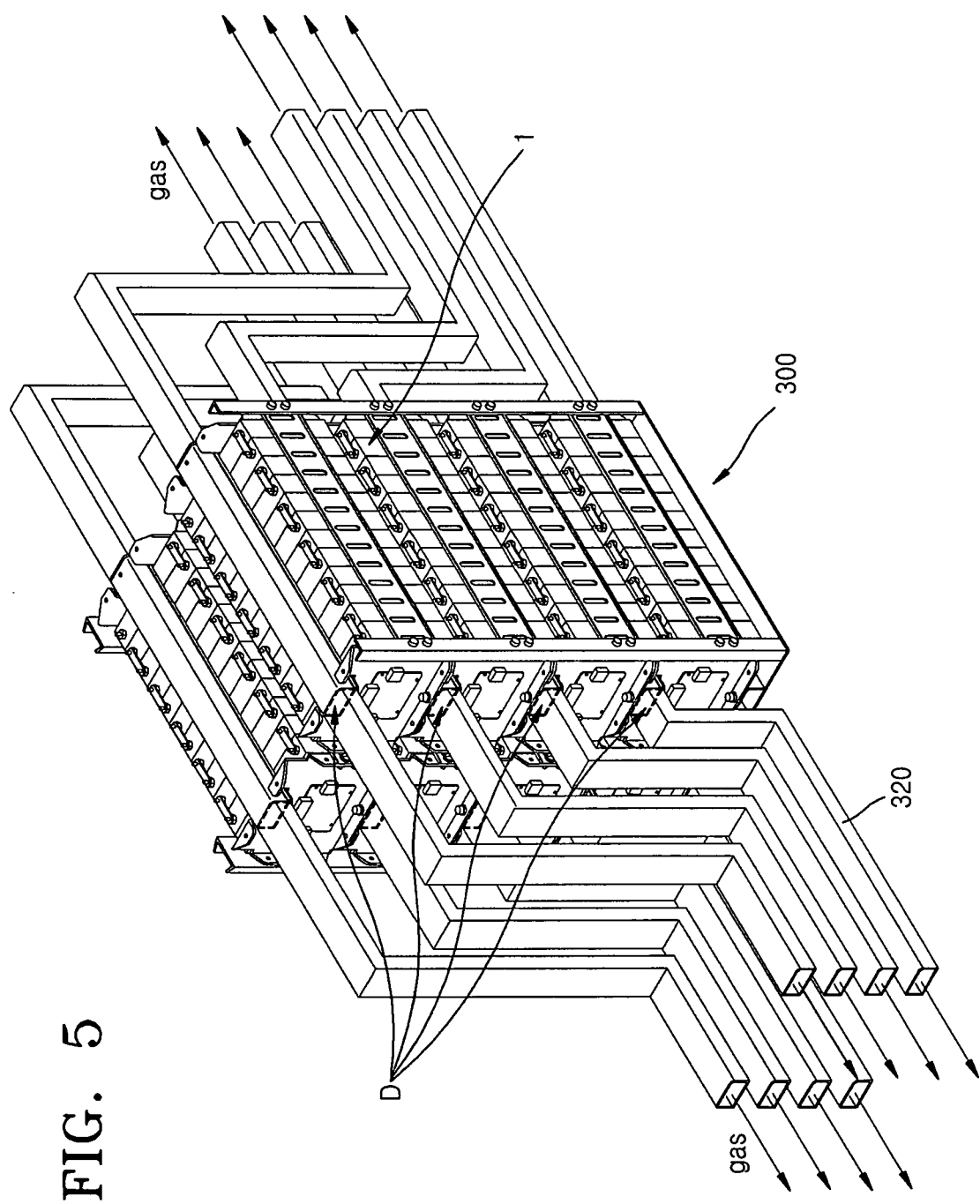
FIG. 5 illustrates a schematic perspective view of a battery pack according to an embodiment.

FIG. 5 illustrates a schematic perspective view of a battery pack 300 according to an embodiment. The battery pack 300 may be formed by layering four battery modules 1 in two rows. Thus, the battery pack 300 may include eight battery modules 1. Each battery module 1 may include, e.g., twelve secondary batteries 10 arranged in a predetermined direction.

Figure 6:
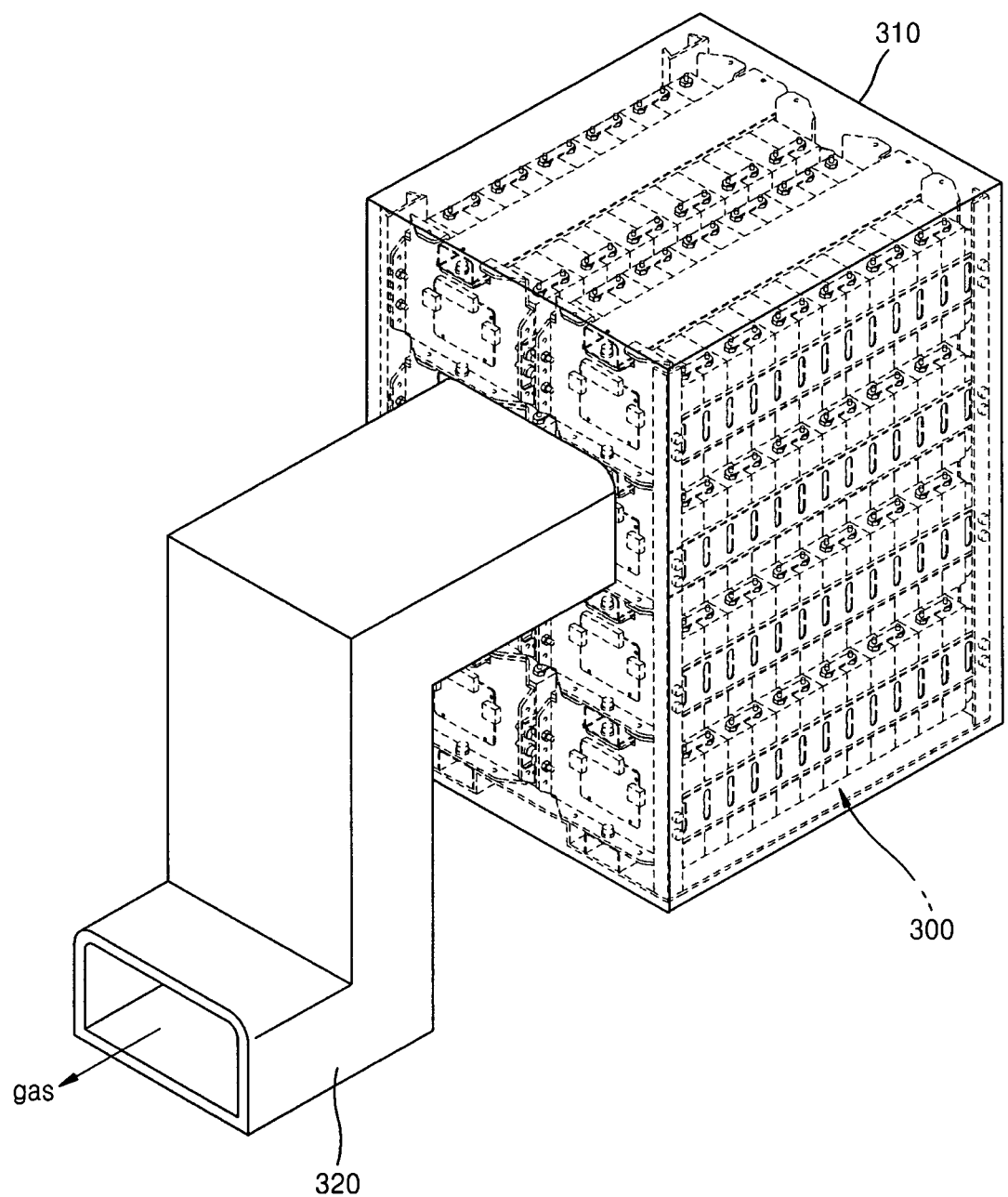
FIG. 6 illustrates a schematic perspective view of a battery pack according to another embodiment.

Among the four battery modules 1 in each stack, the respective bottom plates 30 and top plates 20 may correspond to each other to form three degassing ducts D for emitting gas. Further, the upper portions of the top plates 20 of the uppermost battery modules 1 in each stack may be covered, thereby forming a fourth degassing duct D in each stack. Each duct D may be connected to an outlet 320 to emit gas to the outside. The method of emitting gas generated in the battery pack 300 to the outside is not limited to use of the respective ducts D and the outlets 320. For example, FIG. 6 illustrates a schematic perspective view of a battery pack 300 according to another embodiment. Referring to FIG. 6, by forming a battery pack sealing body 310 for sealing the battery pack 300, the gas generated in the battery pack 300 may be emitted through an outlet 320' connected to the battery pack sealing body 310. Thus, gas may be emitted to the outside by not only forming ducts D in the battery pack 300, but by sealing the battery pack 300 with the battery pack sealing body 310.

Figure 7:
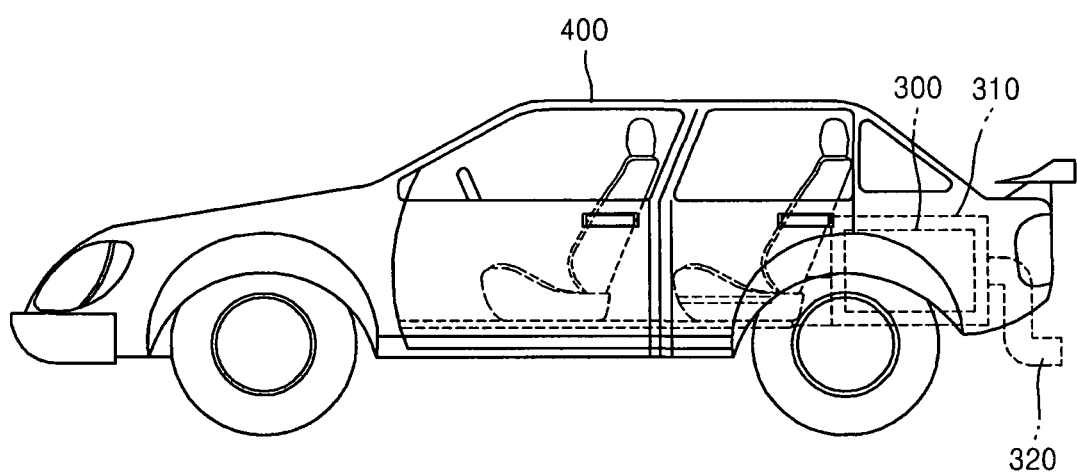
FIG. 7 illustrates a schematic conceptual diagram of a hybrid electric vehicle including a battery pack according to an embodiment.

FIG. 7 illustrates a schematic conceptual diagram of a hybrid electric vehicle 400 including a battery pack according to an embodiment, e.g., the battery pack 300 of FIG. 6. If the battery pack 300 including the secondary batteries 10 explodes, or if gas is generated due to another reason, toxic gas may be explosively generated in a short time. If the toxic gas flows into a space occupied by people, it may be harmful to the people. Accordingly, as illustrated in FIG. 5, the ducts D may be formed in the battery pack 300 to emit the toxic gas to the outside of the hybrid electric vehicle 400. In another implementation, as illustrated in FIGS. 6 and 7, the battery pack 300 may be sealed with the battery pack sealing body 310 to emit the toxic gas through the outlet 320 to the outside of the hybrid electric vehicle 400.

According to one or more embodiments, a battery pack may include a plurality of stacked battery modules, wherein each of the battery modules includes a plurality of secondary batteries arranged in a predetermined direction and electrically connected to one another; a pair of end plates disposed at both end portions of the secondary batteries; a restraint plate which compresses so that the secondary batteries do not extend in a longitudinal direction and is connected to side portions of the pair of end plates; a top plate connected to upper portions of the pair of end plates and forming an opening corresponding to a vent of the secondary batteries; and a bottom plate which is connected to lower portions of the pair of end plates to support the weight of the secondary batteries and is formed to correspond to a top plate of another of the battery modules disposed underneath such that the bottom plate serves as a duct for emitting gas when gas is generated in the vent of a secondary batteries of the other battery module disposed underneath.

The battery pack may further include a sealing member interposed between the bottom plate and the top plate of the other battery module disposed underneath for sealing therebetween. The battery pack may further include a sealing ring interposed between the opening of the bottom plate and the plurality of secondary batteries. The bottom plate may be formed in a "⊏" shape so that an inlet of the bottom plate faces downwards.

Each of the plurality of secondary batteries may include an electrode terminal. Both upper end portions of the end plate may extend to correspond to at least a height of the electrode terminal, and a groove including a bottom surface corresponding to a height of the secondary battery may be formed in the center of both upper end portions. The top plate may be formed in correspondence to the groove of the end plate of the battery module disposed underneath. The bottom plate may be formed in correspondence to a groove of the end plate of the other battery module disposed underneath.

The lower end portion of the end plate may be coupled with an upper end portion of the end plate of the other battery module disposed underneath so as to compress the coupling between the bottom plate and the top plate of the other battery module disposed underneath.

A duct may be formed on the top plate of the uppermost battery module of the stacked battery modules. An outlet may be connected to the bottom plate serving as a duct for emitting gas and the top plate of the other battery module disposed underneath to emit gas to the outside. The battery pack may be used in a hybrid electric vehicle. The battery pack may be sealed so that gas generated in the battery pack does not flow into the passenger area of the car and is emitted to the outside.

Example embodiments have been disclosed herein, and although specific terms are employed, they are used and are to be interpreted in a generic and descriptive sense only and not for purpose of limitation. Further, descriptions of features or aspects within each embodiment should typically be considered as available for other similar features or aspects in other embodiments. Accordingly, it will be understood by those of skill in the art that various changes in form and details may be made without departing from the spirit and scope of the present invention as set forth in the following claims.

What is claimed is:

1. A battery pack, comprising:
a first battery module, the first battery module including unit batteries, a first plate, and a second plate having a channel shape that includes side parts extending from a top part, the unit batteries of the first battery module being between the first and second plates of the first battery module;
a second battery module, the second battery module including unit batteries, a first plate including gas inlets, and a second plate, the unit batteries of the second battery module including respective vents and being between the first and second plates of the second battery module, each of the respective vents being aligned with one of the gas inlets; and
a sealing member disposed between the side parts of the second plate of the first battery module and the first plate of the second battery module, the sealing member sealing the side parts of the second plate of the first battery module to the first plate of the second battery module to form a duct open to the second plate of the first battery module and the first plate of the second battery module, wherein:
the first battery module is stacked on the second battery module such that each of the vents of the unit batteries of the second battery module faces the first battery module thereabove in a vertical direction,
the second plate of the first battery module is between the first battery module and the second battery module, and
the second plate of the first battery module supports the unit batteries of the first battery module and contacts the first plate of the second battery module, the second plate of the first battery module and the first plate of the second battery module extending along the unit batteries of the second battery module and being combined to form the duct, the duct being coupled to the respective vents of the unit batteries of the second battery module so as to receive gases vented from the unit batteries of the second battery module.

2. The battery pack as claimed in claim 1, wherein:
the first plate of the second battery module is sealed to the unit batteries of the second battery module at the vents of the unit batteries of the second battery module.

3. The battery pack as claimed in claim 1, further comprising a third battery module, the third battery module being combined with the first and second battery modules in a vertical stack, wherein a duct is disposed between the third battery module and one of the first and second battery modules in the vertical stack.

4. The battery pack as claimed in claim 3, further comprising:
a sealing body in which the battery pack is contained, the sealing body receiving gases from respective ducts; and
a collector receiving gases from the respective ducts coupled to the sealing body.

5. The battery pack as claimed in claim 3, further comprising a plurality of collectors including respective outlets coupled to respective ducts.

6. The battery pack as claimed in claim 2, wherein a second sealing member is disposed between the first plate of the second battery module and the unit batteries of the second battery module to seal the gas inlets in the first plate of the second battery module to the vents of the unit batteries of the second battery module.

7. The battery pack as claimed in claim 6, wherein:
the unit batteries of the first battery module include respective vents,
a third sealing member is disposed between the first plate of the first battery module and the unit batteries of the first battery module to seal gas inlets in the first plate of the first battery module to the vents of the unit batteries of the first battery module, and
the battery pack includes a cover sealed to the first plate of the first battery module, the cover and the first plate of the first battery module defining at least part of a duct for venting gases from the unit batteries of the first battery module.

8. The battery pack as claimed in claim 1, wherein:
the top part contacts the unit batteries of the first battery module, and
the side parts extend from the top part towards the second battery module, the side parts stiffening the second plate of the first battery module and contacting the first plate of the second battery module.

9. The battery pack as claimed in claim 1, further comprising a first battery module end plate at an end of the first battery module, and a second battery module end plate at a corresponding end of the second battery module, wherein the second plate of the first battery module is pressed against the first plate of the second battery module by a clamping force applied between the first battery module end plate and the second battery module end plate.

10. The battery pack as claimed in claim 9, further comprising:
    another first battery module end plate at another end of the first battery module, such that the first battery module includes the unit batteries between the first battery module end plates; and
    a first restraint plate disposed along a first side of the unit batteries of the first battery module, and a second restraint plate disposed along a second side of the unit batteries of the first battery module, wherein the first and second restraint plates are fixed to side portions of the first battery module end plates so as to laterally constrain the unit batteries of the first battery module.

11. The battery pack as claimed in claim 10, wherein the first and second restraint plates apply a compressive force to sides of the unit batteries of the first battery module.

12. The battery pack as claimed in claim 1, further comprising a first battery module end plate at an end of the first battery module, and a second battery module end plate at a corresponding end of the second battery module, wherein the second battery module end plate includes extended portions at an upper part thereof and a groove between the extended portions, the groove receiving the second plate of the first battery module and the first plate of the second battery module.

13. The battery pack as claimed in claim 12, wherein the extended portions have a height that is less than a sum of a height of the second plate of the first battery module and a thickness of the first plate of the second battery module.

14. The battery pack as claimed in claim 1, wherein:
    the second plate of the first battery module directly contacts each of the unit batteries of the first battery module and directly contacts the first plate of the second battery module, and
    the duct is directly coupled to the respective vents of the unit batteries of the second battery module.

15. A vehicle, comprising:
    a power source, the power source providing a motive power for the vehicle; and
    the battery pack as claimed in claim 1.

16. A method of forming a battery pack, the method comprising:
    providing a first battery module, the first battery module including unit batteries, a first plate, and a second plate having a channel shape that includes side parts extending from a top part, the unit batteries of the first battery module being between the first and second plates of the first battery module;
    arranging a second battery module adjacent to the first battery module such that the first battery module is stacked on the second battery module, the second battery module including unit batteries, a first plate including gas inlets, and a second plate, the unit batteries of the second battery module including respective vents and being between the first and second plates of the second battery module, each of the respective vents being aligned with one of the gas inlets; and
    sealing the side parts of the second plate of the first battery module to the first plate of the second battery module with a sealing member disposed between the side parts of the second plate of the first battery module and the first plate of the second battery module to form a duct open to the second plate of the first battery module and the first plate of the second battery module, wherein:
    the first battery module is stacked on the second battery module such that each of the vents of the unit batteries of the second battery module faces the first battery module thereabove in a vertical direction,
    the second plate of the first battery module is disposed between the first battery module and the second battery module,
    the second plate of the first battery module is disposed to support the unit batteries of the first battery module and to contact the first plate of the second battery module,
    the second plate of the first battery module and the first plate of the second battery module extend along the unit batteries of the second battery module and are combined to form the duct, and
    the duct is coupled to the respective vents of the unit batteries of the second battery module so as to receive gases vented from the unit batteries of the second battery module.

* * * * *